D. H. WILSON.
METHOD OF CHARGING STORAGE BATTERIES.
APPLICATION FILED APR. 24, 1911. RENEWED JUNE 27, 1914.
1,126,666.
Patented Jan. 26, 1915.
2 SHEETS—SHEET 1.
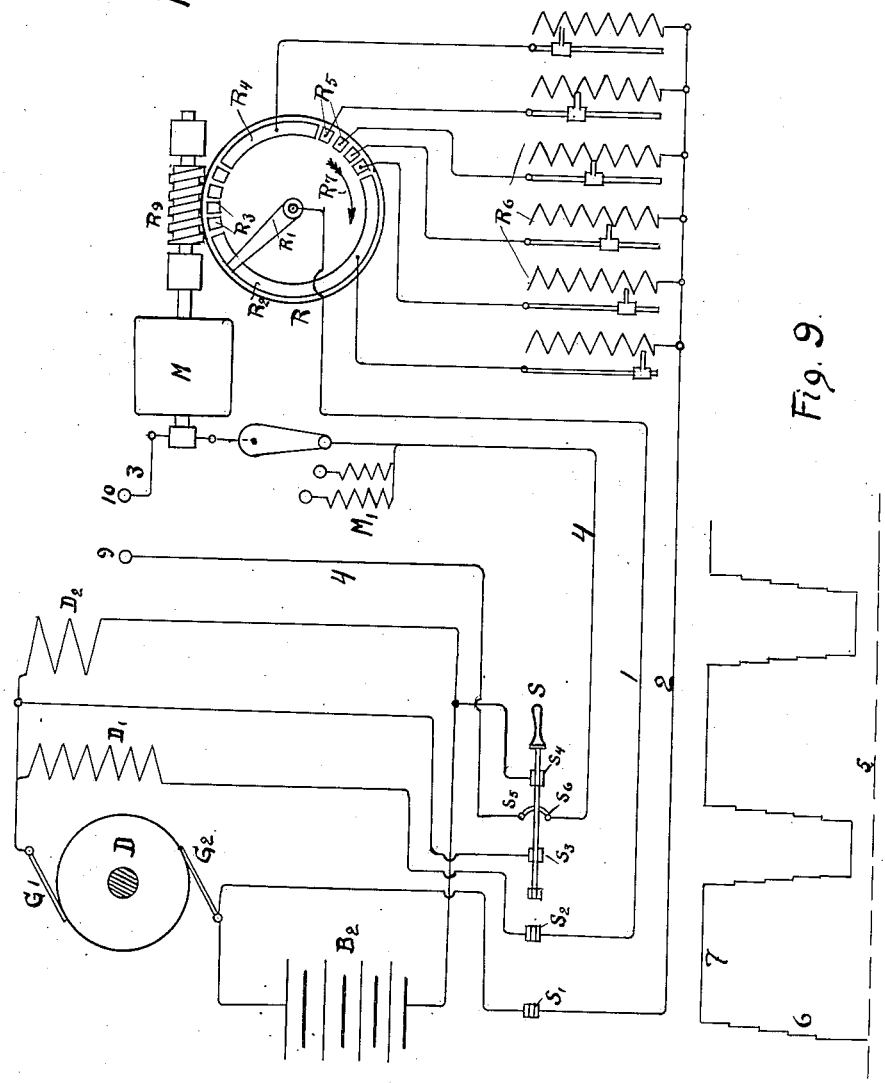
Witnesses:
Hilding Sjodahl
Marion L. Chandler
Inventor
David H. Wilson
By his Attorneys
Hill & Simms

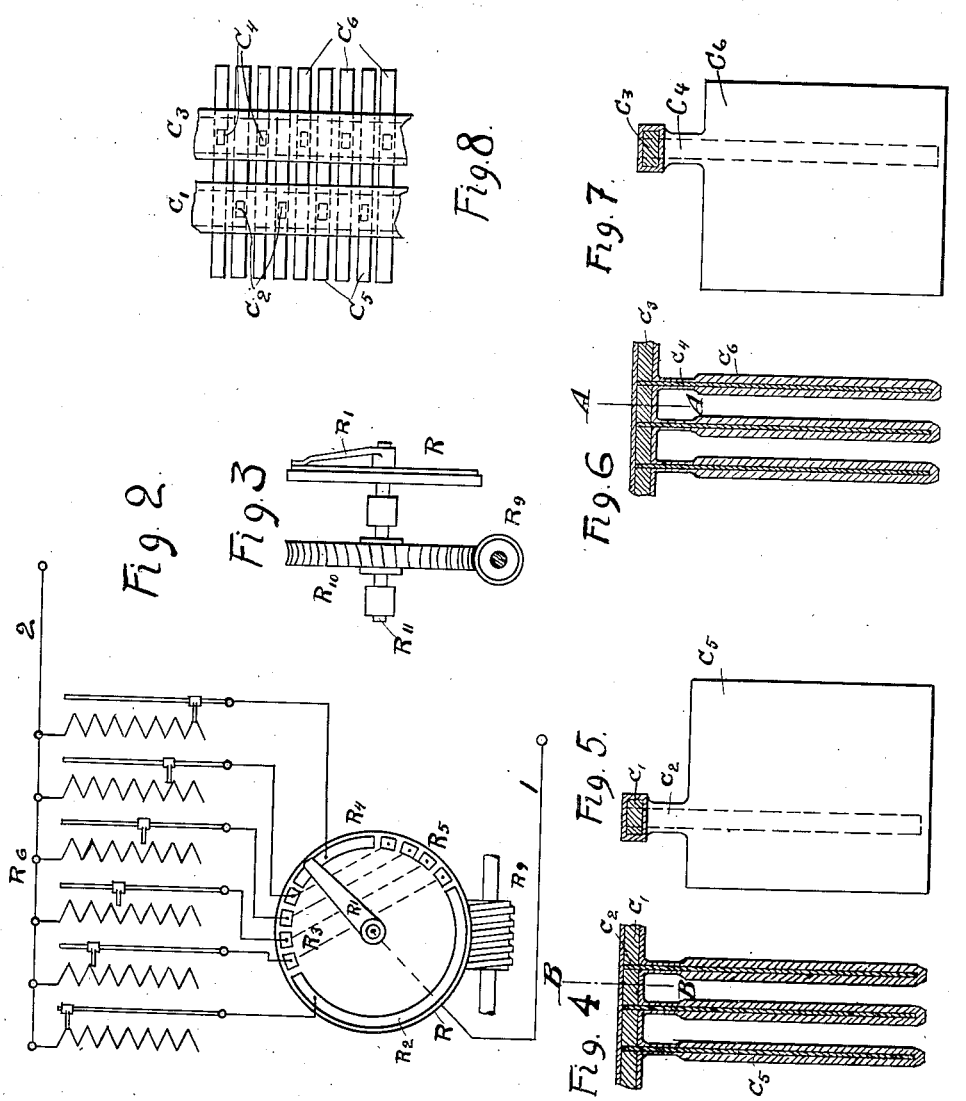

UNITED STATES PATENT OFFICE.

DAVID H. WILSON, OF MEADVILLE, PENNSYLVANIA, ASSIGNOR TO WILSON STORAGE BATTERY COMPANY, OF NEW YORK, N. Y., A CORPORATION OF NEW YORK.

METHOD OF CHARGING STORAGE BATTERIES.

1,126,666.  Specification of Letters Patent.  Patented Jan. 26, 1915.

Application filed April 24, 1911, Serial No. 623,053. Renewed June 27, 1914. Serial No. 847,780.

*To all whom it may concern:*

Be it known that I, DAVID H. WILSON, a citizen of the United States, and resident of Meadville, in the county of Crawford and State of Pennsylvania, have invented a certain new and useful Method of Charging Storage Batteries, of which the following is a specification.

My invention consists in a method of charging storage batteries which has many marked advantages over the systems now known.

One of the advantages and results of charging two batteries with the heavy current described in this patent is the elimination of what is known as "forming." During manufacture plates are subjected to a charging current of low amperage—below that which causes active "gasing"—for the purpose of "forming" active material from the original lead. In the ordinary charging of batteries "forming" action continues until plates deteriorate. My heavy current during charging avoids this action and this deterioration is substantially eliminated.

One of the objects of my invention is to greatly reduce the time required to store electrical energy in a storage battery. In accomplishing this result I charge the battery with a heavy amperage of current and create such conditions as will dissipate the resistance or obstacles to charging created by the heavy charge so as to permit the heavy charge to have an efficient effect upon said plates without undue dissipation of energy in the form of heat, and then charge with the heavy amperage again. In carrying out this object I prefer in connection with the heavy charges of current, to employ conditions which dissipate the gas or other obstacles to charging, created by the heavy charges. I further prefer to alternate the heavy charges of current with those conditions which are established to dissipate the resistance or obstacles to charging.

The resistance or obstacles to charging at high current rate usually consist in gases generated within the battery by the heavy charging current which tend to insulate the acid solution from the battery plates: or which tend to prevent the passage of current from one to the other. Many different means may be employed to dissipate the resistance or obstacles to charging. I prefer to drop the high amperage on the heavy charge to such a light charge as will restore efficient charging conditions.

The range of current which lies within the field of my invention may be described as that which will not injure or destroy the battery plates containing low resistance pathways leading into their interiors but which would injure or destroy plates, other conditions being equal, which were not provided with such low resistance pathways.

My invention is applicable mainly to the storage batteries having plates composed of lead or equivalent material with low resistance pathways adapted to lead the current into the interiors of said plates. As a rule these low resistance pathways are embedded in the lead, although they may be located anywhere as long as destructive chemical action with the electrolyte is prevented. My invention is applicable more specifically to plates composed of homogeneous material except for low resistance pathways.

Another object of my invention is to evenly distribute the charge of current over the plates and corrugations and extend it from the outer portions of the corrugations to the innermost corners.

Another object of my invention is to cause the charge to penetrate into the plates to a considerable depth and to penetrate more or less evenly over the whole corrugated surfaces of the plates, thus eliminating shedding.

Another object of my invention is to distribute the current evenly through the plates in such a way as to prevent their buckling. This is assisted by running an electrical distributer of high conductivity through the plates in such a way as to enlarge the area of contact between each distributer and its plate. This enlarged area of contact and the proper location of the distributers also prevents heating. The area of contact between the distributers and plates is proportioned to the active area of the plates to insure these results.

Another object of my invention is to time the periodical heavy charges of current so as to insure the maximum charging effect and then when the creation of gases interferes with efficient charging to again establish efficient charging conditions by the methods mentioned above. When the gases are dissipated sufficiently to permit another efficient charging the amperage is preferably again increased up to the maximum amount which my battery construction makes possible and convenient.

Another object of my invention is to graduate the changes of current from the high amperage to the conditions which dissipate the obstacles to efficient charging in such a way as not to interfere with the general working of the circuit and its efficiency and to prevent any reversals of the fields of the charging apparatus. Any means which will prevent such reversals of the fields and will permit any change of current to cause the gases to dissipate will accomplish this object of my invention. When the current is to be restored to the full amperage it is "stepped up" through resistances, either internal or external, or any other suitable means.

Another object of my invention is to time the intermittent charging current, or the periodicity of its waves to get the quickest and best results. This is preferably done automatically by means of a motor of some kind, the speed of which is determined and which cuts in or cuts out resistances automatically in the shunt fields and thereby the frequency of the charging waves is predetermined and fixed to secure efficient results.

In the drawings: Figure 1 is a diagram of the circuits and apparatus which I employ to attain my method. Fig. 2 shows a diagram view of the automatic resistance and resistance coil connections. Fig. 3 is a side elevation of portions of the automatic resistance construction. Fig. 4 is a view partly in longitudinal section of a group of battery plates. Fig. 5 is a section thereof taken upon the line B—B Fig. 4. Fig. 6 is a side elevation with parts in longitudinal section of another group of battery plates for connection to the opposite pole of the charging circuit. Fig. 7 is a section thereof upon the line A—A. Fig. 8 is a plan view of the plates and their connections to cell bus bars. Fig. 9 shows a current wave form from a high amperage to a low amperage value.

In Fig. 1 I employ a dynamo D having a shunt field $D^1$ and a series field $D^2$. A switch is employed having a lever S adapted to come into contact with the contact points $S^1$ and $S^2$ which leaves the dynamo with both series and shunt field coils in active condition to charge an ordinary battery. The switch S may be thrown over to close the circuit, at the contacts $S^3$ and $S^4$ thereby short-circuiting the series field circuit $D^2$: and also making independent contact from $S^5$ and $S^6$ which closes the circuit 3 and 4 to a source of current at 9 and 10, so as to operate the motor which drives the automatic resistance R; and leaves the shunt coil $D^1$ in circuit through the following conductors and apparatus:—brush, $G^1$ of the dynamo, shunt field $D^1$ conductor 1, automatic resistance brush $R^1$ of the automatic resistance R, some one of the contacts $R^2$, $R^3$, $R^4$, or $R^5$ through some one of the resistance coils $R^6$ connected thereto and brush $G^2$. The coils $R^6$ have varying degrees of resistance thus varying the resistance or ampere field turns and hence varying or controlling the output of the charging machine. The battery $B^2$ is of the particular type shown by applicant in the drawing, Fig. 8; or it may be of any other type which is capable of being charged by applicant's method.

My preferred method of varying the charging current to the battery $B^2$ is accomplished by the relation of the different mechanisms and circuits shown in the drawing. The automatic resistance brush $R^1$ is caused to revolve in the direction of the arrow $R^7$ and to establish the circuit from the dynamo brush $G^1$ through the shunt field $D^1$, the conductor 1, the automatic resistance brush $R^1$, contact $R^2$ of the automatic resistance, to coil $R^6$ of the automatic resistance thence to the conductor 2 to the brush $G^2$. This circuit has a varying automatic resistance; and since the automatic resistance is in series with the shunt field of the charging apparatus, a varying amperage is developed and delivered to the battery. As the brush $R^1$ travels over the contacts $R^3$ the amount of current that is permitted to pass through the automatic resistance connections is decreased from contact to contact owing to the fact that higher resistances are introduced into the shunt field circuit until finally the brush reaches the contact $R^4$, which is connected to the highest resistance to such an extent that perhaps but one tenth of an ampere per square inch plate surface is caused to pass through the battery, $B^2$. When the brush $R^1$ passes from the contact $R^4$ it passes successively over the contacts $R^5$ which successively decrease the resistance introduced into the circuit of the shunt field coil in such a way as to cause a larger and larger volume of current to flow through the battery until the brush $R^1$ has reached the contact $R^2$ again. I prefer to time this automatic resistance so that it makes approximately 12 to 15 revolutions an hour. I find that it may remain upon the contact $R^2$ for about 170 seconds. The current is then "stepped down" in probably 10 seconds to the amount which is permitted to pass through the battery by the contact $R^4$. The brush $R^1$ rests upon the contact $R^4$ perhaps nearly a minute and then the circuit is rapidly "stepped up" so that larger and larger amounts flow through the battery as the brush $R^1$ passes over the contacts $R^5$ and reaches the contact $R^2$. These periods of time preferably vary with the various changes of my method so as to give the most efficient results.

In Fig. 2 the automatic resistance R is shown together with the contact connections; also how the arm $R^1$ is driven by the worm $R^9$ which in turn is driven by the motor M which is capable of any speed regulation as by the rheostat $M^1$. The object of this arrangement is to automatically drive the brush $R^1$ over the automatic resistance contacts and to regulate the time of the current waves delivered to the battery in such a way that the periodicity of the charges or amperage supplied to the battery is predetermined and regulated. In Fig. 3 the worm $R^9$ is shown meshing with the worm gear $R^{10}$ which is fixed to the shaft $R^{11}$ which carries the brush $R^1$.

In Fig. 4 is shown the copper buses $C^1$ connected to the copper distributers $C^2$ which pass through the plates $C^5$ substantially to the bottom thereby furnishing a large area of contact between the distributers which have high conductivity, and the plates which have comparatively low conductivity. The wide area of contact between the two metals permits the heavy amperage of current to pass from a distributer to the lead or other material in the plate over such a large surface that it has no opportunity to heat as it would have if the surface was small in area. The location of the distributers also distributes the charge evenly on opposite sides of the plates, and over their surfaces.

In Fig. 5 the distributers $C^2$ are indicated in broken lines where they extend substantially to the bottom of the plates.

Fig. 6 shows the alternate set of plates having the bus $C^3$ and the plate distributers $C^4$.

Fig. 7 shows a side elevation thereof where the distributers $C^4$ extend down through the plates $C^6$ substantially to the bottom.

Fig. 8 shows the longitudinal buses $C^1$ and $C^3$ together with the distributers $C^2$ and $C^4$ so alternated as to furnish paths of more or less equal resistance from one electrode to the other; or from a negative distributer to a positive distributer, and so distribute the passage of the current from the distributer to the plates that it conducts the current more or less evenly to the whole surface of the plate.

In Fig. 9 is shown the wave form of the charging current. Taking the line 5 as zero, the current is stepped up through resistances in such a way that its wave formation may be indicated by the stepped line 6; until full amperage is attained as indicated by the line 7. The current is then stepped down and up as shown.

In operating my method I throw the switch lever S so that it engages contact points $S^3$ and $S^4$ thus throwing the shunt field coils and the automatic resistance into operative relation with the charging machine armature to vary the amperage delivery of the charging machine. The automatic resistance varies the resistance in the shunt field coil circuit periodically causing the charging machine to deliver the current described for the periods stated, and then the amperage is dropped down by degrees to one tenth of an ampere or thereabout until the gases have disappeared and then the amperage is again raised to a heavy charge. This process continues until the battery has been charged, when it is disconnected from the circuit.

Many variations of my method are possible. Broadly speaking any means to eradicate the obstacles to efficient charging with a heavy current, such as the low amperage means described herein, or any other means that will accomplish the same result, said heavy charging current being applied during substantially most or all of the time that it may be used efficiently, lie within the scope of my invention. In other words my invention consists in the employment together of a heavy charging current, and a means to eliminate, dissipate, or subdue the obstacles created by the heavy charge, so that the heavy charging current may be applied efficiently to the storage battery.

My method also consists in a more or less even distribution of conducting metal of high conductivity through the plate subject to the charging current, and a corresponding even distribution of the charging current over the plate surfaces.

Having thus described my invention, what I claim as new and desire to secure by Letters Patent is:

1. The method of charging a storage battery having plates composed of lead or equivalent material containing low resistance pathways adapted to lead the current into the interior of the plates which consists in applying to it periodically a charging current having an amperage per square inch of plate surface within the amount which can be applied thereto and maintain substantially the efficiency of the plates and greater than the amount which would destroy the plates, other conditions being equal, if composed entirely of high resistance metal, said periods being separated by intermissions to permit the dissipation of the obstacles to charging created by said charging periods, and during such intermissions charging the plates with a current of low degree to permit the said dissipation of the obstacles to charging.

2. The method of charging a storage battery having plates composed of lead or equivalent material containing low resistance pathways adapted to lead the current into the interior of the plates which consists in applying to it periodically a charging current having an amperage per square inch of plate surface within the amount which can be applied thereto and maintain substantially the efficiency of the plates and greater than the amount which would destroy the plates, other conditions being equal, if composed entirely of high resistance metal, said periods being separated by intermissions to permit the dissipation of the obstacles to charging created by said charging periods, and during such intermissions charging the plates with a current of low degree to permit the said dissipation of the obstacles to charging, the periods of charging being limited to the time during which the plates may be steadily charged with efficiency and the intermissions being limited to the time required for freeing the plates of the obstacles to charging.

3. The method of charging storage batteries having lead plates provided with leading-in pathways having sufficient low resistance to admit to the active surfaces thereof without injury a current which will injure or destroy ordinary lead plates having no such low resistance pathways, which consists of the application thereto of a heavy charging current of such dimensions as would injure or destroy said plates having no low resistance pathways and accompanied by gasing, said application of current being in periods; and said periods being separated by intermissions characterized by the dissipation of gases created during said charging periods.

4. The method of charging storage batteries having lead plates provided with leading-in pathways having sufficient low resistance to admit to the active surfaces thereof without injury a current which will injure or destroy ordinary lead plates having no such low resistance pathways, which consists of the application thereto of a heavy charging current of such dimensions as would injure or destroy said plates having no low resistance pathways and accompanied by gasing, said application of current being in periods; said periods lasting until the "gasing" prevents further efficient charging by said heavy current.

5. The method of charging storage batteries having lead plates provided with leading-in pathways having sufficient low resistance to admit to the active surfaces thereof without injury a current which will injure or destroy ordinary lead plates having no such low resistance pathways, which consists of the application thereto of a heavy charging current of such dimensions as would injure or destroy said plates having no low resistance pathways and accompanied by gasing, said application of current being in periods; said periods lasting until the "gasing" prevents further efficient charging by said heavy current; said intermissions lasting until the gases created during said charging periods are substantially dissipated.

6. The method of charging storage batteries having lead plates provided with leading-in pathways having sufficient low resistance to admit to the active surfaces thereof without injury a current which will injure or destroy ordinary lead plates having no such low resistance pathways, which consists of the application thereto of a heavy charging current of such dimensions as would injure or destroy said plates having no low resistance pathways and accompanied by gasing, said application of current being in periods; and said periods being separated by intermissions characterized by the dissipation of gases created during said charging periods; said intermissions lasting until the gases created during said charging periods are substantially dissipated.

Signed at New York in the county of New York and State of New York this 13th day of April A. D. 1911.

DAVID H. WILSON.

Witnesses:
 MYRON F. HILL,
 A. L. TRAVIS.